United States Patent [19]
Grob et al.

[11] 3,884,196
[45] May 20, 1975

[54] ROTARY ENGINE

[76] Inventors: Theodore Grob, 1549 Ulao Rd., Grafton, Wis. 53024; Donald H. Tesker, 272 Shady Lane Rd., Saukville, Wis. 53080

[22] Filed: May 25, 1973

[21] Appl. No.: 364,020

[52] U.S. Cl. ............... 123/8.41; 418/210; 418/215
[51] Int. Cl. ............................................. F02b 53/08
[58] Field of Search .......... 123/8.41, 8.23; 418/210, 418/215

[56] References Cited
UNITED STATES PATENTS

| | | | |
|---|---|---|---|
| 1,131,072 | 3/1915 | Morin | 123/8.41 |
| 1,877,250 | 9/1932 | Meyer | 123/8.41 |
| 1,909,880 | 5/1933 | Meyer | 123/8.41 |
| 2,196,675 | 4/1940 | Humrichouse | 123/8.41 |
| 3,595,210 | 7/1971 | Lampis | 123/8.41 |

*Primary Examiner*—C. J. Husar
*Assistant Examiner*—Leonard Smith
*Attorney, Agent, or Firm*—Edmond T. Patnaude

[57] ABSTRACT

A rotary engine includes an intake and compression chamber and an axially aligned combustion and exhaust chamber interconnected by a plurality of transfer passages, and a two-part rotor having flipper gates pivotally mounted on each part.

7 Claims, 13 Drawing Figures

3,884,196

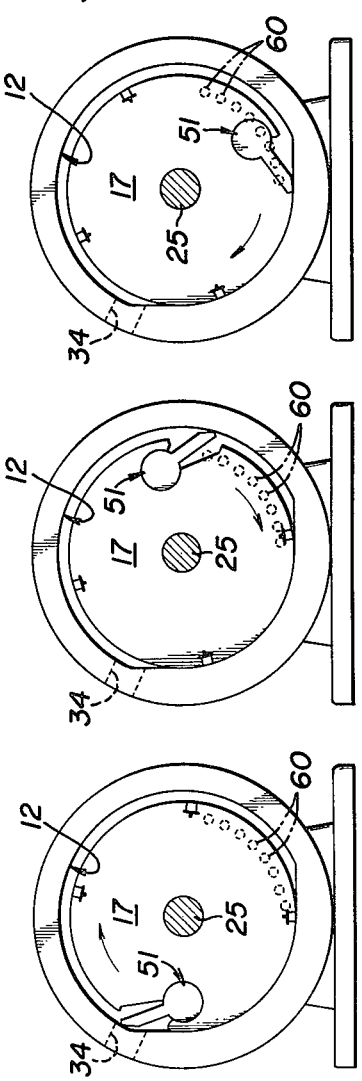

ROTARY ENGINE

The present invention broadly relates to rotary type internal combustion engines, and it relates more particularly to a new and improved two-stage rotary engine wherein a combustible gaseous mixture is drawn into a first chamber and compressed therein, transferred to a mutually aligned combustion chamber wherein it is ignited, burned and exhausted.

BACKGROUND OF THE INVENTION

Internal combustion engines of the type using a rotary piston are well known and in some respects have advantages over the reciprocating piston engines. However, the prior art rotary engines have proven to be difficult to manufacture and while requiring fewer moving parts than reciprocating engines, do have a large number of moving parts. It would be desirable, therefore, to provide a new and improved rotary engine having fewer moving parts and which uses parts which can be manufactured at a reasonable cost.

OBJECTS OF THE INVENTION

Accordingly, a principal object of the present invention is to provide a new and improved internal combustion engine.

Another object of this invention is to provide a new and improved rotary engine.

A further object of this invention is to provide a rotary engine wherein compression takes place in one chamber and combustion takes place in another chamber.

A still further object of this invention is to provide a novel compression and transfer system for use in an internal combustion engine.

SUMMARY OF THE INVENTION

Briefly, the above and further objects may be realized in accordance with the present invention by providing a block having a pair of axially aligned chambers separated by a ring having a plurality of transfer openings therethrough in one arcuate segment therein, a pair of interconnected cylindrical rotors respectively positioned in said chambers, and a pair of interconnected cylindrical rotors respectively positioned in said chambers, and a pair of pivotable flipper gates respectively carried by said rotors. One rotor and its associated flipper gate draws gas into the first chamber during a first portion of a revolution of the rotor and compresses the gas and transfers it to a cavity in the periphery of the other rotor during the succeeding revolution of the rotor. The compressed gas in the cavity of the second rotor is ignited and expands to drive the rotors while the burned gases from the preceding combustion cycle are simultaneously exhausted.

BRIEF DESCRIPTION OF THE DRAWINGS

The above and further objects and a better understanding of the present invention may be had by reference to the following detailed description wherein:

FIGS. 4 through 8 are schematic views of the rotor parts during different portions of an operating cycle of the engine; FIGS. 4A–8A showing the intake and compression rotor part; and FIGS. 4B–8B showing the combustion and exhaust rotor part.

DETAILED DESCRIPTION OF THE INVENTION

Figure 3:
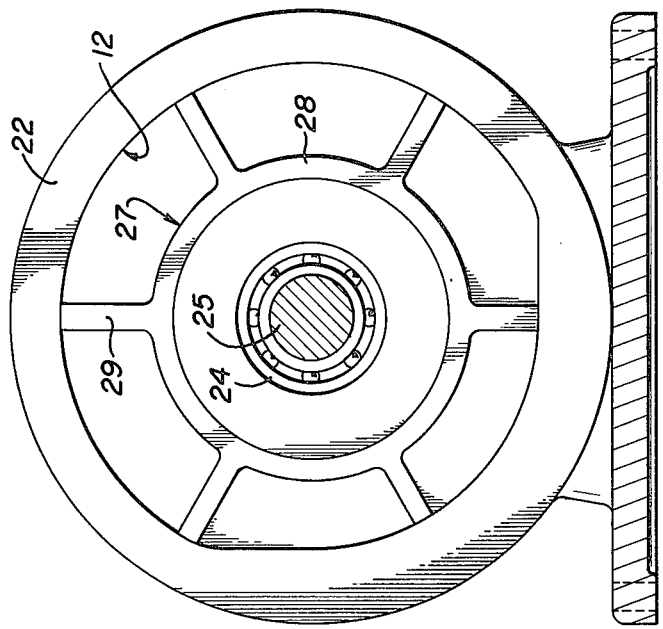
FIG. 3 is a sectional view taken along the line 3—3 of FIG. 1 to show the shape of the seals at the ends of the rotor.
Figure 2:
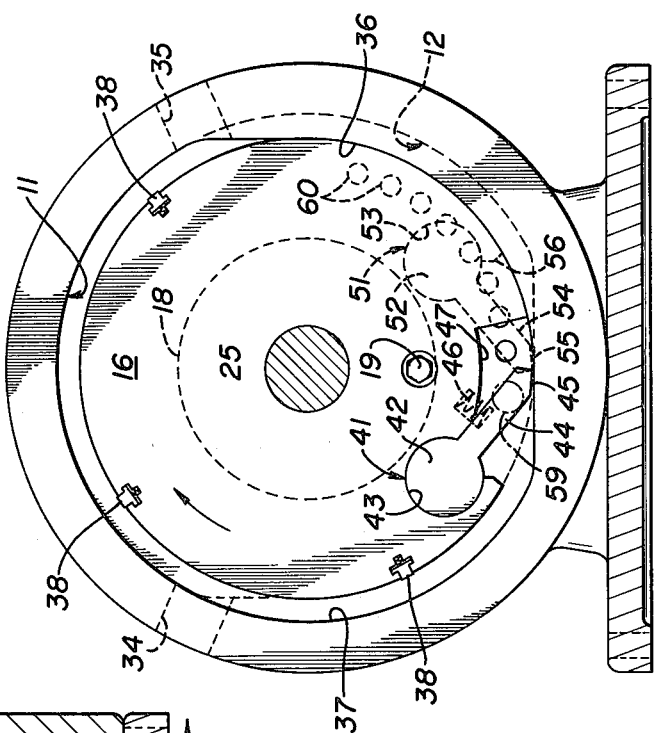
FIG. 2 is a sectional view of the engine of FIG. 1 taken along the line 2—2 thereof to particularly show the combustion chamber and associated rotor part.
Figure 1:
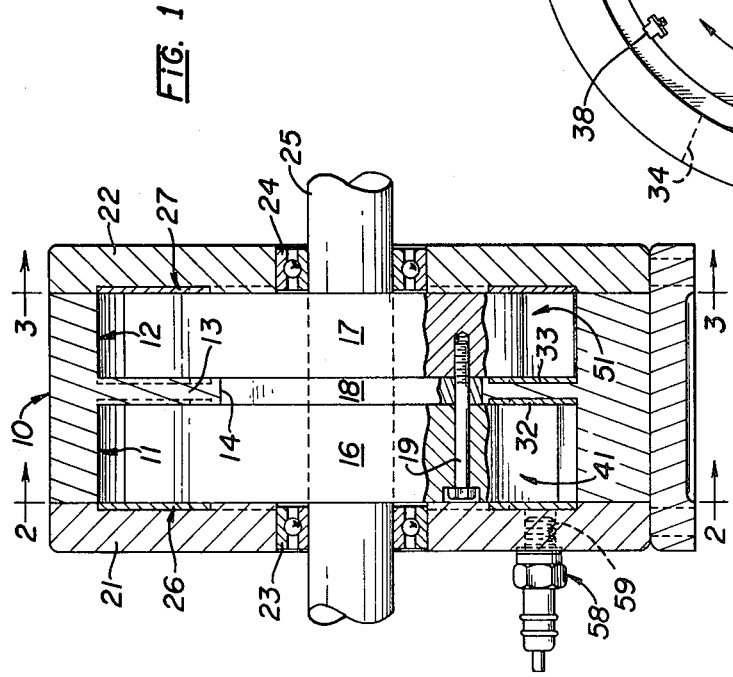
FIG. 1 is a vertical section of a two-stage rotary type internal combustion engine embodying the present invention.

Referring now to the drawings and particularly to FIGS. 1, 2, and 3 thereof, a housing or block 10 has a combustion chamber defining recess or counterbore 11 at one end and an identically shapead compression chamber defining recess or counterbore 12 at the other end. As described hereinafter and shown in FIGS. 2 and 3, the recesses 11 and 12 are not cylindrical but are easily machined in the block. An integral internal flange 13 separates the two chambers and has a centrally disposed circular opening 14. The rotor includes a pair of cylindrical parts 16 and 17 respectively positioned in the recesses 11 and 12 and a central interconnecting portion 18 of reduced diameter extending through the opening 14. Preferably, the rotor part 18 is integral with one or the other of the rotor parts 16 and 17 and a plurality of screws 19 are used to fixedly secure the parts 16 and 17 together. A pair of end plates 21 and 22 are secured by bolts (not shown) over the ends of the housing 10 to complete the two chambers, and axially disposed bearings 23 and 24 are mounted thereon for rotatably receiving the drive shaft 26 to which the rotor is keyed. A pair of identically shaped end seals 26 and 27 are mounted in correspondingly shaped recesses in the inner faces of the end plates 21 and 22.

As best shown in FIG. 3, the end seal 27 has an interior annular ring portion 28 and a plurality of radial portions 29. The ring portion 28 is disposed outwardly of the bolts 19 and prevents leakage from the compressing chamber toward the interior of the engine. The purpose of the radial arms 29 is to prevent leakage between different parts of the compression and combustion chambers as described more fully hereinafter. The inner face of the seal 27 is planar as is the outer face of the rotor part 17 against which it abuts. If desired, manufacturing tolerances may be increased by spring loading the end seal 27 against the rotor. As mentioned above, the seal 26 is identical in shape to the seal 27.

A second pair of seals 32 and 33 are respectively mounted in correspondingly shaped recesses in opposite faces of the flange 13. The seals 32 and 33 are of similar shape to the end seals 26 and 27 and also include a ring shaped central portion and radially extending armlike portions.

As shown in FIG. 2, an inlet port 34 extends through the wall of the housing 10 into the compression chamber, and an outlet port 35 extends through the wall of the housing 10 in the combustion chamber. The recess 11 forming the compression chamber has an arcuate portion 36 substantially equal in radius to the external radius of the rotor and an arcuate portion 37 of substantially larger radius. The portion 36 has an angular length of about ninety degrees and the portions 36 and 37 are interconnected by wall portions extending tangentially to the small radius portion 36. As shown in FIG. 3, the recess 12 is shaped identically to that of the recess 11 but is oriented at an angle of ninety degrees relative thereto. A plurality of seals 38, equal in length to the width of the rotor parts 16 and 17, are mounted in spaced apart undercut grooves in the peripheries of the rotor parts 16 and 17. The seals 38 are spring biased in an outward direction and are held captive in the undercut grooves in the rotor parts by enlarged base portions. The seals 38 engage the smaller arcuate portions of the two chambers to prevent leakage thereacross.

An imperforate flipper gate 41 has a cylindrical base portion 42 pivotally mounted in a cylindrical groove 43 in the rotor part 16. An arm or blade 44 extends radially from the base portion 42 and has an angularly faced end portion 45 which is urged by centrifugal force against the peripheral wall of the chamber 16 during operation of the engine. Prior to starting, the flipper gate 41 is urged into sealing engagement with the chamber wall by a coil spring 46. The gate 41 is an integral member having a width equal to that of the rotor part 16 whereby the side edges thereof sealably engage the seals 21 and 32. A recess 47 is provided in the periphery of the rotor part 16 adjacent the trailing edge of the gate 41 to provide a chamber wherein maximum compression of the combustible gas and and subsequent ignition occurs as described hereinafter.

An identical flipper gate 51 has a cylindrical body portion 52 pivotally received in a cylindrical recess 53 in the rotor part 17. An arm or blade 54 extends from the body portion 52 and has an angularly faced end portion 55 which sealably engages the peripheral wall of the recess 12. A spring (not shown) biases the gate 51 into sealing engagement with the wall of the recess 12, and a recess 56 is provided in the periphery of the rotor part 17 to permit the gate 51 to pivot toward the rotor as the rotor rotates.

A spark plug 58 is mounted in a threaded hole 59 in the end plate 21 which opens into the combustion chamber a short angular distance clockwise from the trailing edge of the smaller radius portion 36 and onto the space within the recess 47. The plug 58 is timed by conventional means suitably mounted to the flywheel (not shown) to ignite the compressed gas contained in the recess 47 as it passes the plug during every revolution of the rotor.

OPERATION

Referring now to FIGS. 4–8, FIG. 4-A shows the rotor part 17 at the beginning of the intake cycle, and FIG. 4B shows the rotor part 16 at the same time. At this time the flipper gate 51 is just passing the inlet port 34 as the rotor rotates in a clockwise direction. As the gate 51 travels clockwise toward the position shown in FIG. 5A a vacuum is created behind the gate which sucks a combustible gaseous mixture such as air and atomized gasoline from the inlet port 34 into the space behind the gate and between the rotor part 17 and the walls of the recess 12. Since the small diameter portion of the recess 12 is just behind the inlet port 34 and is sealingly engaged by the rotor part 17 or its associated seals 38, the portion of the chamber ahead of the gate 51 is sealed from the portion behind it. After one substantially complete revolution of the rotor the space between the rotor and the large radius portion of the recess 12 is filled with the combustible gas so that during the succeeding revolution that gas ahead of the gate 51 is compressed as the gate 51 moves clockwise away from the inlet port. When the gate 51 reaches the position shown in FIG. 5A the gas compressed in the chamber ahead of the valve 51 is transferred into the compression chamber through the first of a plurality of arcuately positioned holes or ports 60 in the flange 13. These ports 60 are angularly coincident with the small diameter portion of the recess 11 whereby the compressed gas enters only the cavity 47 in the rotor part 16 behind the gate 41. At the end of the transfer cycle as shown in FIG. 6, all of the compressed gas has been transferred from the compression chamber into the cavity 47. As the cavity 47 then passes the spark plug 58, which position is shown in FIG. 7, the plug is fired to ignite the gas and commence the combustion and power cycle. As the gas begins to burn and expand in the recess 47 a clockwise thrust is exerted on the gate 41 and thus on the rotor to drive the rotor in a clockwise direction. When the gate 41 next passes the exhaust port 35, which position is shown in FIG. 8B, the burned gases are partially exhausted. The remaining burned gases are forcibly exhausted as the gate 41 passes across the wall of the combustion chamber sweeping the burned gases ahead of it and out through the exhaust port.

It may thus be seen that with the engine of the present invention, a power cycle occurs during 270° of each rotation of the rotor and a compression cycle occurs during 270° of each rotation of the rotor. The transfer cycle occurs during the remaining ninety degrees. It will be apparent to those skilled in the art that, if desired, two or more compression and power cycles for each revolution of the rotor can be provided by using two or more pairs of transfer ports and correspondingly located small diameter arcuate chamber portions, and two or more pairs of gates.

While the present invention has been described in connection with a particular embodiment thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. An internal combustion engine of the rotary type comprising axially aligned combustion and compression chambers, a rotor having a first portion in said compression chamber and a second portion in said combustion chamber, a fuel inlet port to said compression chamber and an exhaust port from said combustion chamber, a wall mutually separating said combustion and compression chambers, transfer passageway means extending through said wall and opening onto said chambers at locations whereby to be closed during a portion of each revolution of said rotor, said transfer passageway means comprising a plurality of openings through said wall and extending over a substantial arcuate distance to transfer compressed gas from said compression chamber to said combustion chamber at a gradually increasing pressure throughout a substantial portion of each revolution of said rotor, and means for igniting the compressed gas in said combustion chamber while said transfer passageway means is closed by said rotor.

2. The engine set forth in claim 1, wherein
said second portion of said rotor has a peripheral recess wherein ignition occurs.

3. The engine set forth in claim 1 wherein said chambers each have
a first arcuate wall portion having a radius substantially equal to that of the corresponding rotor portion, and
a second arcuate wall portion having a radius substantially larger than the radius of said first arcuate wall portion.

4. An internal combustion engine according to claim 1 comprising
gate members respectively pivoted to said rotor portions and extending into sealing engagement with the walls of said chambers to separate those portions of said chambers on the leading and trailing sides of said gate members,
said gate members extending in opposite directions relative to the rotation of said rotor.

5. An internal combustion engine of the rotary type comprising
axially aligned compression and combustion chambers each having a
first arcuate wall portion having a radius substantially equal to that of the corresponding rotor portion, and
a second arcuate wall portion having a radius substantially larger than the radius of said first arcuate wall portion,
a rotor having a first portion in said compression chamber and a second portion in said combustion chamber,
said second rotor portion having a peripheral recess therein,
a fuel inlet port to said compression chamber and an exhaust port from said combustion chamber,
said transfer passageway means opening into said chambers at the sides of said rotor portions whereby to be closed by said second rotor portion except during the passage of said recess thereby,
means for igniting the compressed gas in said recess while said transfer passageway means is closed,
movable gate members respectively carried by said rotors and extending into sealing engagement with the walls of said chambers to separate those portions of said chambers on the leading and trailing sides of said gate members, and
said transfer passageway means is positioned adjacent said first arcuate wall portion of said combustion chamber whereby compressed gas is transferred to said recess only while it is passing said first arcuate wall portion thereby to be confined within said recess.

6. The engine set forth in claim 5, wherein said first and second arcuate wall portions are interconnected by planar wall portions extending tangentially to said first arcuate wall portion.

7. The engine set forth in claim 5, wherein said transfer passageway means comprises
a plurality of arcuately positioned holes.

* * * * *